UNITED STATES PATENT OFFICE.

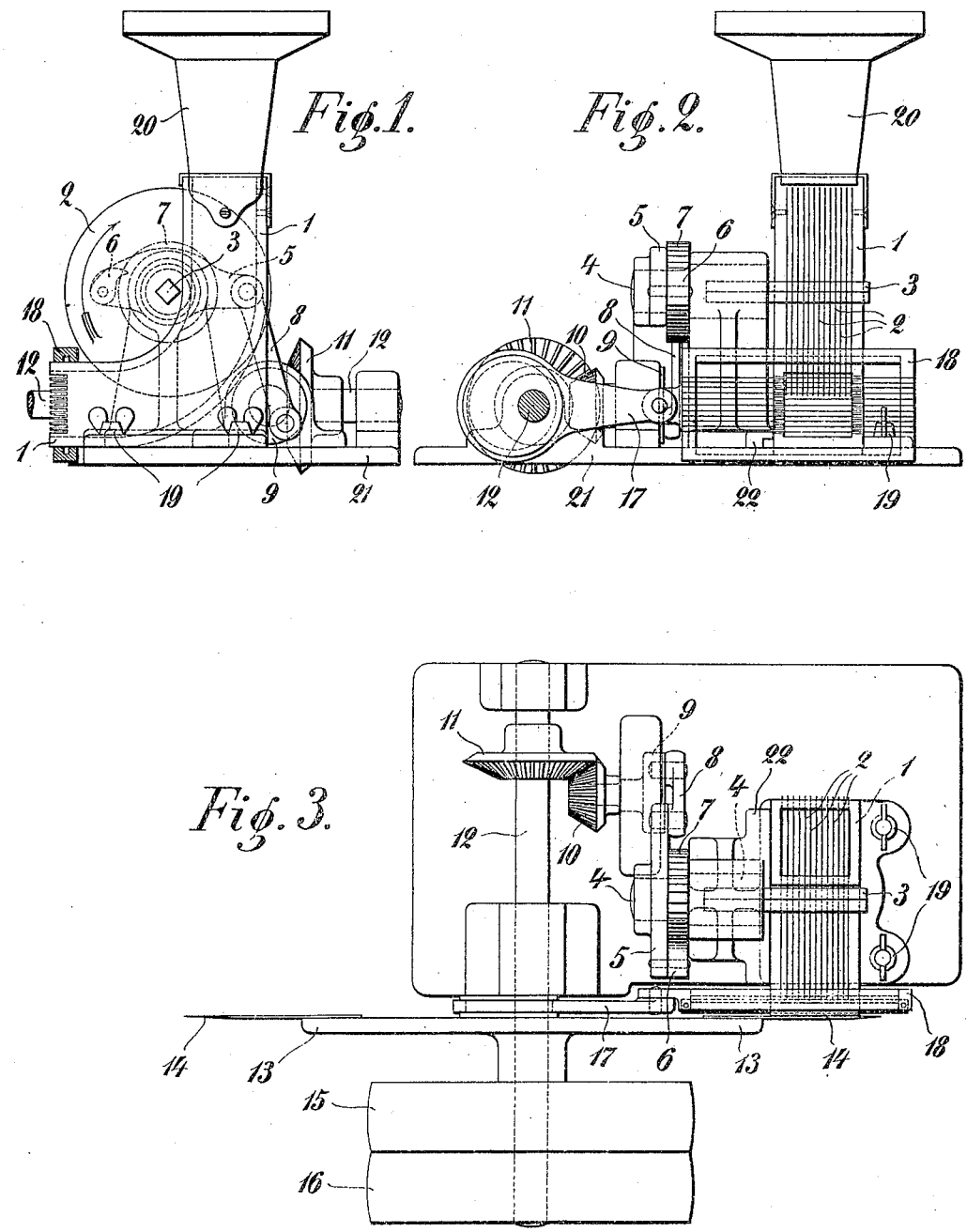

MAX WINTERMEYER, OF HANOVER, GERMANY.

MACHINE FOR CUTTING BACON IN DIES.

935,182.  Specification of Letters Patent.  Patented Sept. 28, 1909.

Application filed August 29, 1907.  Serial No. 390,691.

*To all whom it may concern:*

Be it known that I, MAX WINTERMEYER, a subject of the German Emperor, and resident of Hanover, Germany, have invented certain new and useful Improvements in Machines for Cutting Bacon in Dies, of which the following is a specification.

This invention relates to a machine for cutting raw bacon in dies, which has a curved bacon feed chute and in which the vertical longitudinal cut as well as the advance of the bacon is effected by means of circular cutters and the horizontal longitudinal cut by means of a cutting frame or gate, while a vertically rotating knife accomplishes the third, *i. e.* the transverse cut.

The essence of the invention consists in that, while only one set of circular cutters is employed, the bacon feed chute which has its inlet opening on the top receives a curved form which is suited to the direction of movement imparted to the bacon by the circular cutters, whereby an easy slipping-off of the bacon from the circular cutters is obtained.

In the accompanying drawing, Figure 1 is a side view partly in section, Fig. 2 an end view, and Fig. 3 a plan view, of the improved machine.

Bacon cutting machines with curved bacon feed chutes are already known but these machines have two oppositely disposed circular cutter rollers which work in opposite direction. Consequently, in these machines the curved form of the feed chute which, besides, lies not in the direct reach of the circular cutters, is without any influence on the advance of the material effected by the action of the circular cutters. According to the present invention, the wall of the feed chute receives, beginning from the height of the circular cutter axle, a gradual bend amounting in all to 90°. Hereby, a gradual easy slipping-off of the bacon from the circular cutters is obtained. The wall of the feed chute does not oppose itself to the material to be cut in the vertical direction but recedes, so-to-say, gradually before it and is always met by the bacon in a very oblique direction until the bacon has left the circular cutters. This arrangement necessitates for its working a considerably smaller expenditure of power than all the hitherto known arrangements, as well as the loss of bacon due to crushing is limited to a very small degree, so that the result is perfectly equal to the cutting by hand.

In the example shown, 1 is the curved bacon feed chute of square area, which catches with a ledge beneath a projection 22 of the table 21 to which it is fixed by means of two screws 19. The single knives of the circular cutter roller 2 sit on a square shaft 3 which imparts to them a stepwise rotation in the direction of the arrow (Fig. 2). Projecting through slots, which are located upon opposite sides of the chute and so arranged as to include the bend in the chute, the cutters or knives pass through the whole width and extend through the opposite slots of the chute, so as to convey the bacon introduced into the chute downward in a stepwise way cutting it at the same time into slices of the thickness equal to the distance apart of the single cutters or knives. The second cut vertical thereto is effected by the cutting frame or gate 18 which slides to and fro on rails which are arranged on the bacon feed chute shortly behind the outlet opening of the latter. The to and fro movement is imparted to the frame or gate by means of the eccentric 17 sitting on the main shaft 12 (Fig. 1), the frame having its greatest speed at the time when the bacon receives its advance.

The cutting-off is effected by two knives 14 which are disposed diametrically opposite to each other on the cutter disk 13 which sits also on the main shaft, said knives being adapted upon rotation of said disk to pass directly along the outlet opening of the feed chute so that with one turn of said disk two cut-offs are effected. The drive for the stepwise advance of the circular cutters is also effected from the main shaft 12. The bevel wheel 11 which is fixed to the latter transmits its movement to the bevel wheel 10 which is half as large as the bevel wheel 11 and sits on the crank shaft 9. The latter sets through the medium of the drawing-rod 8 the arresting lever 5 in up and downwardly swinging movement which is stepwise imparted through the pawl 6 to the ratchet wheel 7 on the axle 4 in the direction of the turn of the circular cutters. In the square bore of the axle 4 sits removably the square axle 3 which imparts its movement to the circular cutters 2 sitting thereon. The stepwise advance is always effected at the time when the outlet opening of the bacon receiver is not closed by one of the cutting-off knives 14, so that the advance of the bacon is effected without any impediment and without any crush.

In the example, the main shaft 12 is fitted with a fixed and a loose pulley 15 and 16 respectively for the power transmission from any suitable source.

Having fully described my invention, what I claim and desire to secure by Letters Patent is:—

A machine for cutting bacon in dies, comprising in combination with the bacon feed chute consisting of a vertical upper part and a curved lower part and provided with an upper inlet opening and a lower outlet opening and with vertical slots located upon opposite sides of the chute and including the bend in the chute, one set of circular cutters revolubly mounted in front of said chute and so arranged as to project through said slots into said chute and to extend through the opposite slots in the chute, a reciprocating cutting frame or gate arranged on said chute shortly behind the outlet opening of the same, two rotary cutting knives designed to pass along said outlet opening, and means for operating said cutting devices, all for the purpose set forth.

In testimony whereof I have hereunto set my hand in the presence of two subscribing witnesses.

MAX WINTERMEYER.

Witnesses:
 HANS RENNING,
 HANS ENTNER.